US012553861B2

(12) United States Patent
Adamson

(10) Patent No.: US 12,553,861 B2
(45) Date of Patent: Feb. 17, 2026

(54) METHODS AND SYSTEMS FOR CONTROLLING AN ION MOBILITY SEPARATOR BASED ON A HADAMARD ALGORITHM

(71) Applicant: Thermo Finnigan LLC, San Jose, CA (US)

(72) Inventor: Brian D. Adamson, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 331 days.

(21) Appl. No.: 18/372,427

(22) Filed: Sep. 25, 2023

(65) Prior Publication Data

US 2025/0102464 A1 Mar. 27, 2025

(51) Int. Cl.
*G01N 27/623* (2021.01)
*H01J 49/00* (2006.01)

(52) U.S. Cl.
CPC ........ *G01N 27/623* (2021.01); *H01J 49/0031* (2013.01)

(58) Field of Classification Search
None
See application file for complete search history.

(56) References Cited

U.S. PATENT DOCUMENTS

| | | | |
|---|---|---|---|
| 9,607,817 | B1 | 3/2017 | Ugarov |
| 2014/0316718 | A1 | 10/2014 | Crowell et al. |
| 2020/0278318 | A1 | 9/2020 | Ugarov |
| 2022/0093381 | A1 | 3/2022 | Nieto Ramos |

OTHER PUBLICATIONS

EP24200697.1, Extended European Search Report, Feb. 19, 2025, 5 pages.

Yoon O.K., et al., "Duty Cycle and Modulation Efficiency of Two-Channel Hadamard Transform Time-of-Flight Mass Spectrometry," Journal of the American Society for Mass Spectrometry, Nov. 1, 2005, vol. 16, No. 11, XP027790306, pp. 1888-1901.

*Primary Examiner* — Eliza W Osenbaugh-Stewart

(57) ABSTRACT

A pulse control system may obtain, for each ion pulse included in a plurality of ion pulses, a signal acquired by a mass analyzer for ions ejected from a distinct set of channels of an ion mobility separator having a plurality of channels and determine, based on the signals for the plurality of ion pulses and a Hadamard algorithm, a signal associated with the ions ejected from a channel of the ion mobility separator.

24 Claims, 11 Drawing Sheets

700

706

702-1 702-2 702-3 702-4

| | 702-1 | 702-2 | 702-3 | 702-4 |
|---|---|---|---|---|
| 704-1 | 1 | 1 | 1 | 1 |
| 704-2 | 1 | -1 | 1 | -1 |
| 704-3 | 1 | 1 | -1 | -1 |
| 704-4 | 1 | -1 | -1 | 1 |

Fig. 7A

708

714

710-1 710-2 710-3

| | | Channel 1 | Channel 2 | Channel 3 |
|---|---|---|---|---|
| 712-1 | Pulse 1 | Open | Open | Open |
| 712-2 | Pulse 2 | Closed | Open | Closed |
| 712-3 | Pulse 3 | Open | Closed | Closed |
| 712-4 | Pulse 4 | Closed | Closed | Open |

Fig. 7B 900 906 902-1 902-2 902-3

| | Channel 1 | Channel 2 | Channel 3 |
|---|---|---|---|
| Pulse 1 | Signal | Signal | Signal |
| Pulse 2 | 0 | Signal | 0 |
| Pulse 3 | Signal | 0 | 0 |
| Pulse 4 | 0 | 0 | Signal |

904-1 904-2 904-3 904-4

Fig. 9A 908 906 902-1 902-2 902-3

| | Channel 1 | Channel 2 | Channel 3 |
|---|---|---|---|
| Pulse 1 | + Signal | + Signal | + Signal |
| Pulse 2 | 0 | - Signal | 0 |
| Pulse 3 | + Signal | 0 | 0 |
| Pulse 4 | 0 | 0 | - Signal |

904-1 904-2 904-3 904-4

Fig. 9B

1000

| | 1002-1 | 1002-2 | 1002-3 | 1002-4 | 1002-5 | 1002-6 | 1002-7 | 1002-8 |
|---|---|---|---|---|---|---|---|---|
| 1004-1 | 1 | 1 | 1 | 1 | 1 | 1 | 1 | 1 |
| 1004-2 | 1 | -1 | 1 | -1 | 1 | -1 | 1 | -1 |
| 1004-3 | 1 | 1 | -1 | -1 | 1 | 1 | -1 | -1 |
| 1004-4 | 1 | -1 | -1 | 1 | 1 | -1 | -1 | 1 |
| 1004-5 | 1 | 1 | 1 | 1 | -1 | -1 | -1 | -1 |
| 1004-6 | 1 | -1 | 1 | -1 | -1 | 1 | -1 | 1 |
| 1004-7 | 1 | 1 | -1 | -1 | -1 | -1 | 1 | 1 |
| 1004-8 | 1 | -1 | -1 | 1 | -1 | 1 | 1 | -1 |

Fig. 10A

1006

| | | 1010-1 | 1010-2 | 1010-3 | 1010-4 | 1010-5 | 1010-6 | 1010-7 |
|---|---|---|---|---|---|---|---|---|
| | | Channel 1 | Channel 2 | Channel 3 | Channel 4 | Channel 5 | Channel 6 | Channel 7 |
| 1012-1 | Pulse 1 | Open | Open | Open | Open | Open | Open | Open |
| 1012-2 | Pulse 2 | Closed | Open | Closed | Open | Closed | Open | Closed |
| 1012-3 | Pulse 3 | Open | Closed | Closed | Open | Open | Closed | Closed |
| 1012-4 | Pulse 4 | Closed | Closed | Open | Open | Closed | Closed | Open |
| 1012-5 | Pulse 5 | Open | Open | Open | Closed | Closed | Closed | Closed |
| 1012-6 | Pulse 6 | Closed | Open | Closed | Closed | Open | Closed | Open |
| 1012-7 | Pulse 7 | Open | Closed | Closed | Closed | Closed | Open | Open |
| 1012-8 | Pulse 8 | Closed | Closed | Open | Closed | Open | Open | Closed |

Fig. 10B

METHODS AND SYSTEMS FOR CONTROLLING AN ION MOBILITY SEPARATOR BASED ON A HADAMARD ALGORITHM

BACKGROUND INFORMATION

Ion mobility analyses may be performed with an ion mobility separator having a gas flow region and multiple channels exiting from the gas flow region to separate ions within a sample based on ion mobility properties of the ions. The separated ions are transmitted to a mass analyzer of a mass spectrometer to detect, identify, and/or quantify the ions based on their mass-to-charge ratio (m/z). As an example, ions may be introduced into the gas flow region having a flow of gas in a first direction and an electric field in a second direction. As the ions are carried downstream in the first direction by the flow of gas, the electric field directs the ions in the second direction toward the multiple channels of the ion mobility separator.

The ions migrate through the ion mobility separator in accordance with the ion mobility properties of the ions and spatially separate from each other during the migration such that ions of different ion mobilities enter into different channels of the ion mobility separator. For example, larger ions (e.g., ions having a greater cross-section) may travel more slowly in the second direction than smaller ions (e.g., ions having a smaller cross-section), which results in a separation of ions along the first direction. This separation allows ions exiting the gas flow region and entering a channel to have a different range of ion mobility relative to ions entering an adjacent channel. For example, the smaller ions will enter the first (upstream) channels while the larger ions will enter the later (downstream) channels. As the ions enter the channels, each channel of the ion mobility separator accumulates a subset of ions and periodically ejects a packet of accumulated ions toward the mass analyzer.

Conventionally, the multiple channels of the ion mobility separator are opened sequentially so that accumulated ions from only one channel are ejected at a time. As a result, each channel of the ion mobility separator accumulates large quantities of ions between successive ejections from the channel, which may lead to space charge effects within the channel as well as heating of the ions, fragmentation of the ions, and/or wasting of the ions.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a system comprises one or more processors and memory storing executable instructions that, when executed by the one or more processors, cause a computing device to: open, based on a Hadamard algorithm, a distinct set of channels of an ion mobility separator comprising a plurality of channels for each ion pulse included in a plurality of ion pulses, wherein, during each ion pulse of the plurality of ion pulses, ions accumulated in the open channels are ejected toward a mass analyzer;

obtain, for each ion pulse of the plurality of ion pulses, a signal acquired by the mass analyzer for the ejected ions; and determine, based on the signals for the plurality of ion pulses and the Hadamard algorithm, a signal associated with the ions ejected from a channel of the ion mobility separator.

In some illustrative examples, a non-transitory computer-readable medium storing instructions that, when executed, direct at least one processor of a computing device to: control an ion mobility separator to open, based on a Hadamard algorithm, a distinct set of channels of the ion mobility separator comprising a plurality of channels for each ion pulse included in a plurality of ion pulses, wherein, during each ion pulse of the plurality of ion pulses, ions accumulated in the open channels are ejected toward a mass analyzer; obtain, for each ion pulse of the plurality of ion pulses, a signal acquired by the mass analyzer for the ejected ions; and determine, based on the signals for the plurality of ion pulses and the Hadamard algorithm, a signal associated with the ions ejected from a channel of the ion mobility separator.

In some illustrative examples, a system comprises: an ion mobility separator including a plurality of channels, wherein each channel of the plurality of channels is configured to accumulate ions according to mobilities of the ions; a mass analyzer configured to generate a signal based on ions ejected from the plurality of channels and detected by the mass analyzer; and at least one computing device communicatively coupled to the ion mobility separator and the mass analyzer and configured to perform a process comprising: opening, based on a Hadamard algorithm, a distinct set of channels of the ion mobility separator for each ion pulse included in a plurality of ion pulses, wherein, during each ion pulse of the plurality of ion pulses, ions accumulated in the open channels are ejected toward the mass analyzer; obtaining, for each ion pulse of the plurality of ion pulses, a signal acquired by the mass analyzer for the ejected ions; and determining, based on the signals for the plurality of ion pulses and based on the Hadamard algorithm, a signal associated with the ions ejected from a channel of the ion mobility separator.

BRIEF DESCRIPTION OF THE DRAWINGS

The accompanying drawings illustrate various examples and are a part of the specification. The illustrated examples are merely illustrative and do not limit the scope of the disclosure. Throughout the drawings, identical or similar reference numbers designate identical or similar elements.

FIG. 7A shows a schematic of an illustrative implementation of a Hadamard matrix.

FIG. 7B shows a schematic of an illustrative implementation for controlling an ion mobility separator based on the Hadamard matrix of FIG. 7A.

FIGS. 9A and 9B show schematics of illustrative implementations of the matrices for determining a signal associated with the implementation of FIG. 7B.

FIGS. 10A and 10B show schematics of other illustrative implementations for controlling an ion mobility separator based on a Hadamard matrix.

DETAILED DESCRIPTION

Figure 1:
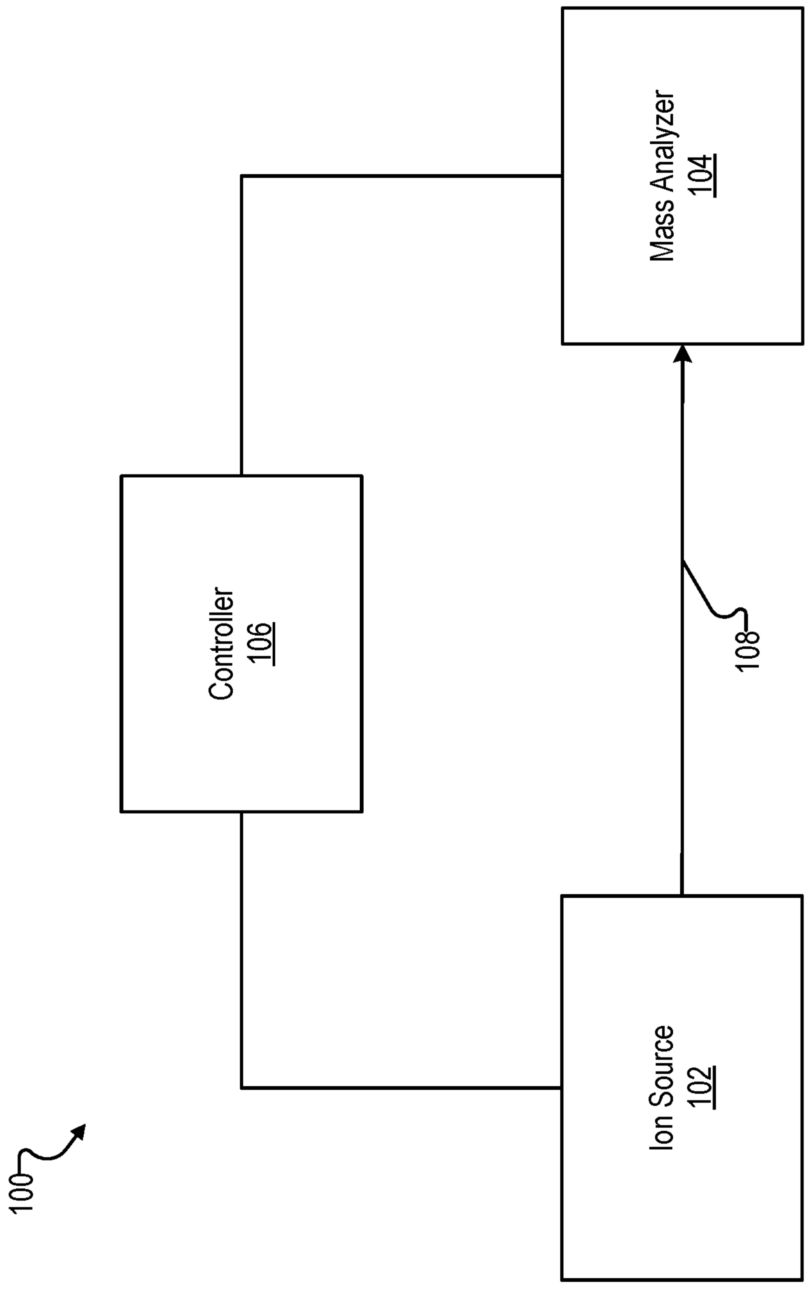
FIG. 1 shows functional components of an illustrative mass spectrometer.

Systems and methods for controlling an ion mobility separator are described herein. In some illustrative examples, a system may control an ion mobility separator comprising a plurality of channels to open a distinct set of channels for each ion pulse of a plurality of ion pulses, such as based on a Hadamard algorithm. During each ion pulse of the plurality of ion pulses, ions accumulated in the open channels of the ion mobility separator may be ejected toward a mass analyzer. The system may obtain, for each ion pulse of the plurality of ion pulses, a signal acquired by the mass analyzer for the ejected ions. Based on the signals for the plurality of ion pulses and the Hadamard algorithm, the system may determine a signal associated with the ions ejected from a channel of the ion mobility separator.

For example, in an illustrative Hadamard algorithm, the system may control the ion mobility separator to open the distinct set of channels in sequences of ion pulses that are orthogonal to each other. The system may also determine a signal associated with ions ejected from a select channel of the ion mobility separator based on the Hadamard algorithm, such as by deconvolving signals acquired by the mass analyzer for the plurality of ion pulses to isolate the signal associated with the ions ejected from the select channel. To illustrate, the system may add the signals acquired by the mass analyzer for each ion pulse of the plurality of ions pulses during which the select channel was open and subtract the signals acquired by the mass analyzer for each ion pulse of the plurality of ion pulses during which the select channel was closed.

The systems and methods described herein may provide various benefits, which may include one or more advantages over conventional systems and ion mobility separators. For example, in conventional ion mobility systems the channels of the ion mobility separator are opened one channel at a time. As a result, the conventional systems have suboptimal efficiency and the ions accumulated in the channels of the ion mobility separator may near a maximum capacity of the channels, leading to space charge effects, heating of the ions, fragmentation of the ions, and/or wasting of the ions. In contrast, the systems and methods described herein are configured to operate the ion mobility separator based on a Hadamard algorithm. As a result, the systems and methods described herein improve the efficiency of the ion mobility separator as well as limit the amount of time that ions may be contained within channels of the ion mobility separator. This may prevent space charge effects, heating of the ions, fragmentation of the ions, and/or wasting of the ions. Moreover, the systems and methods described herein may allow for lower capacity channels as compared with channels of conventional systems.

Various examples will now be described in more detail with reference to the figures. The systems and methods described herein may provide one or more of the benefits mentioned above and/or various additional and/or alternative benefits that will be made apparent herein.

The systems and methods described herein may be implemented in conjunction with a mass spectrometer. FIG. 1 shows functional components of an illustrative mass spectrometer 100. As shown, mass spectrometer 100 includes an ion source 102, a mass analyzer 104, and a controller 106. Mass spectrometer 100 may further include any additional or alternative components (not shown) as may suit a particular implementation (e.g., ion optics, filters, an autosampler, etc.).

Ion source 102 is configured to produce a stream 108 of ions from a sample and deliver the ions to mass analyzer 104. Ion source 102 may utilize various energy sources, such as electrical, light, plasma, chemical, electrons, heat, or the like to ionize the sample and/or components of the sample. For example, ion source 102 may be implemented by any suitable ion source, such as a matrix assisted laser desorption/ionization (MALDI) source, an electrospray ionization (ESI) source, an atmospheric pressure chemical ionization (APCI) source, an atmospheric pressure photoionization source (APPI), an inductively coupled plasma (ICP) source, an electron ionization source, a chemical ionization source, a photoionization source, a glow discharge ionization source, a thermospray ionization source, and the like.

Mass analyzer 104 is configured to receive ion stream 108 and separate the ions according to m/z of each of the ions. Mass analyzer 104 may be implemented by any suitable mass analyzer, such as a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap, such as an Orbitrap mass analyzer, a Kingdon trap, etc.), a Fourier transform ion cyclotron resonance (FT-ICR) mass analyzer, a sector mass analyzer, and the like.

An ion detector (not shown) is configured to detect ions at each of a variety of different m/z and responsively generate an electrical signal representative of ion intensity. The electrical signal is transmitted to controller 106 for processing, such as to construct a mass spectrum of the sample. For example, mass analyzer 104 may emit an emission beam of separated ions to the ion detector, which is configured to detect the ions in the emission beam and generate or provide data that can be used by controller 106 to construct a mass spectrum of the sample. The ion detector may be implemented by any suitable detection device, including without limitation an electron multiplier, a Faraday cup, and the like.

Controller 106 may be communicatively coupled with, and configured to control operations of, mass spectrometer 100. For example, controller 106 may be configured to control operation of various hardware components included in ion source 102 and/or mass analyzer 104. To illustrate, controller 106 may be configured to control a high voltage applied to an emitter in ion source 102, control an accumulation time of mass analyzer 104, control an oscillatory voltage power supply and/or a DC power supply to supply an RF voltage and/or a DC voltage to mass analyzer 104, adjust values of the RF voltage and DC voltage to select an effective m/z (including a mass tolerance window) for analysis, and adjust the sensitivity of the ion detector (e.g., by adjusting the detector gain). In some implementations, controller 106 may be configured to adjust a polarity of the ion detector, such as based on the polarity of ions being detected (e.g., positive ions and/or negative ions).

Controller 106 may also include and/or provide a user interface configured to enable interaction between a user of mass spectrometer 100 and controller 106. The user may interact with controller 106 via the user interface by tactile, visual, auditory, and/or other sensory type communication. For example, the user interface may include a display device (e.g., liquid crystal display (LCD) display screen, a touch screen, etc.) for displaying information (e.g., mass spectra, notifications, etc.) to the user. The user interface may also include an input device (e.g., a keyboard, a mouse, a touchscreen device, etc.) that allows the user to provide input to controller 106. In other examples the display device and/or input device may be separate from, but communicatively coupled to, controller 106. For instance, the display device and the input device may be included in a computer (e.g., a desktop computer, a laptop computer, etc.) communicatively connected to controller 106 by way of a wired connection (e.g., by one or more cables) and/or a wireless connection.

Controller 106 may include any suitable hardware (e.g., a processor, circuitry, etc.) and/or software as may serve a particular implementation. While FIG. 1 shows that controller 106 is included in mass spectrometer 100, controller 106 may alternatively be implemented in whole or in part separately from mass spectrometer 100, such as by a computing device communicatively coupled to mass spectrometer 100 by way of a wired connection (e.g., a cable) and/or a network (e.g., a local area network, a wireless network (e.g., Wi-Fi), a wide area network, the Internet, a cellular data network, etc.).

In some examples, mass spectrometer 100 may be implemented by a tandem mass spectrometer, which may be tandem-in-time or tandem-in-space. For example, a tandem-in-space mass spectrometer may include, in addition to mass analyzer 104, one or more collision cells and one or more additional mass analyzers (not shown in FIG. 1). The term "collision cell," as used herein, is intended to encompass any structure arranged to produce product ions via controlled dissociation processes and is not limited to devices employed for collisionally-activated dissociation. For example, a collision cell may be configured to fragment the ions using collision induced dissociation (CID), electron transfer dissociation (ETD), electron capture dissociation (ECD), photo induced dissociation (PID), surface induced dissociation (SID), and the like. A collision cell may be positioned upstream from a mass filter, which separates the fragmented ions based on the ratio of mass to charge of the ions. In some examples, mass analyzer 104 may include a combination of multiple mass filters and/or collision cells, such as a triple quadrupole mass analyzer, where a collision cell is interposed in the ion path between independently operable mass filters.

In some examples, mass spectrometer 100 may be coupled with a separation system in a combined system configured to separate components of a sample to be analyzed by mass spectrometer 100. In an analytical run performed by a combined system, the separation system is configured to receive a sample to be analyzed and separate certain components within the sample. In some examples, the separation system may also detect a relative abundance of the separated components, such as by generating a chromatogram representative of the components within the sample. The separation system may be implemented by any device configured to separate components included in the sample, such as a liquid chromatograph (LC) (e.g., a high-performance liquid chromatograph (HPLC)), a gas chromatograph (GC), an ion chromatograph, a capillary electrophoresis system, and the like. Components separated by the separation system are delivered to mass spectrometer 100 for mass analysis by mass spectrometer 100.

Figure 2:
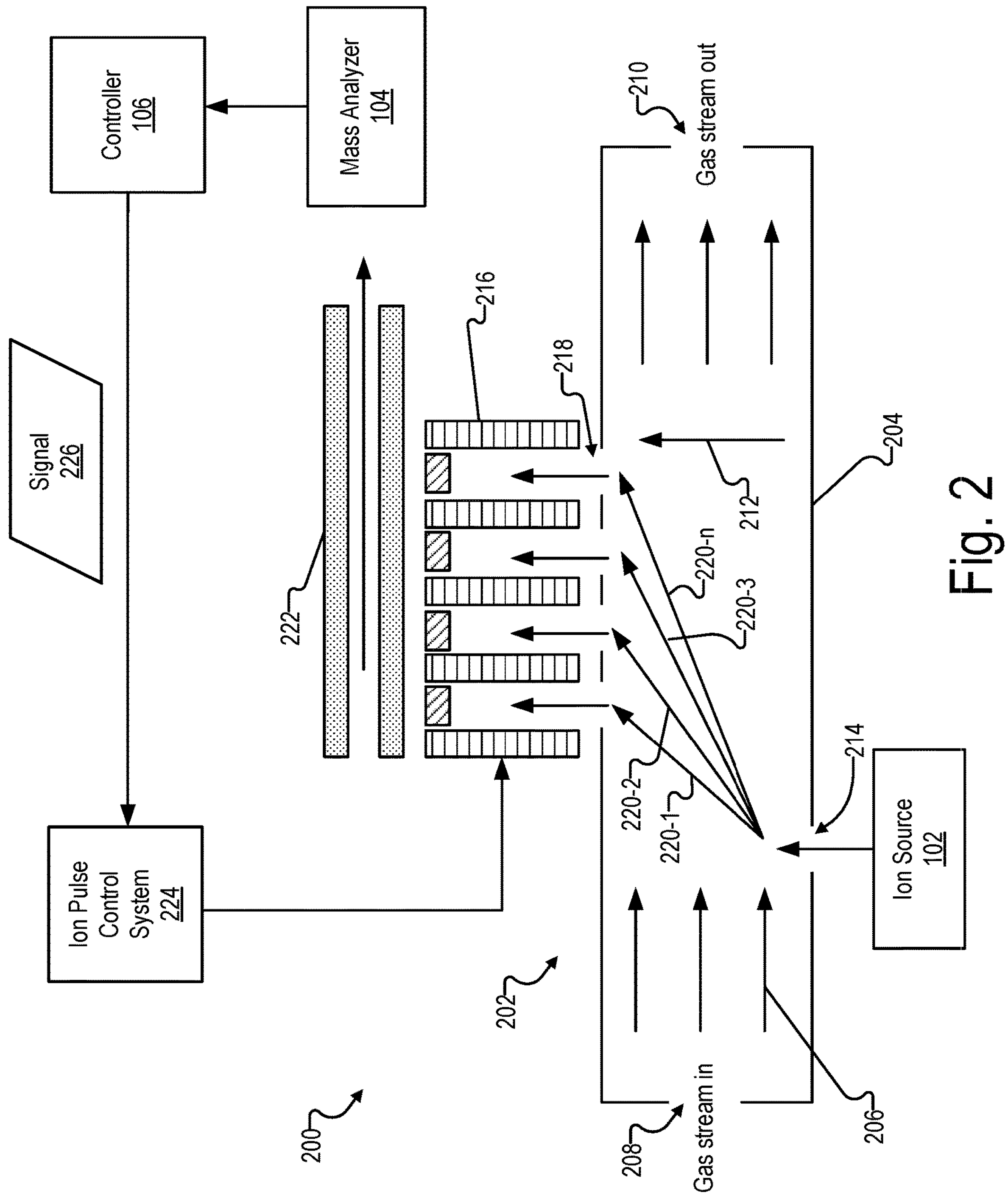
FIG. 2 shows a functional diagram of an illustrative implementation in which an ion mobility separator is incorporated in the mass spectrometer of FIG. 1.

FIG. 2 shows an illustrative implementation 200 in which an ion mobility separator 202 is coupled between ion source 102 and mass analyzer 104. As shown, ion mobility separator 202 includes an ion mobility cell 204 having a gas flow region, such as a substantially rectangular region, with a gas stream (indicated by arrows 206) flowing in a first direction from a gas inlet 208 at one end of ion mobility cell 204 to a gas outlet 210 at another end (e.g., the opposite end) of ion mobility cell 204. Additionally, an electrical field gradient (indicated by arrow 212) is applied in a second direction. In various examples, the first direction and the second direction can form an angle of between about 45 degrees and 135 degrees, such as between about 70 degrees and about 110 degrees. In particular examples, the first direction and the second direction may be substantially orthogonal (at right angles within a small tolerance, e.g., ±5 degrees) to one another. A gas pressure within the ion mobility cell 204 may be between about 1 Torr and about 20 Torr, such as between about 3 Torr and about 6 Torr. In various examples, the gas velocity within ion mobility cell 204 may be between about 100 m/s and about 300 m/s, such as between about 150 m/s and about 200 m/s.

Ions provided by ion source 102 enter ion mobility cell 204 at an ion entrance 214. A plurality of ion channels 216 may be located proximal to a plurality of ion exit orifices 218. In some examples, ion channels 216 and ion exit orifices 218 may be arranged in an array along the first direction. For example, ion exit orifices 218 may be located opposite of ion entrance 214 in the second direction and may be offset (downstream) from ion entrance 214 and spaced apart from one another in the first direction. Ions 220 (e.g., ions 220-1 through **220-*n*, represented by arrows) entering ion mobility cell 204 from ion source 102 may be separated based on their differential ion mobilities into ion exit orifices 218 and directed into the array of ion channels 216. To illustrate, ions 220 may flow at substantially the same velocity along the first direction (due to gas stream 206) and may move in the second direction according to their collisional cross section. For example, ions 220 (e.g., ions 220-*n*) with a larger collisional cross section may move more slowly in the second direction due to a larger number of collisions with the molecules in gas stream 206 relative to ions 220 (e.g., ions 220-1) with a smaller collisional cross section. Due to the slower movement in the second direction, ions 220 with the larger collisional cross section may move farther along the first direction during their transit through ion mobility cell 204. In this way, ions 220 with successively larger collisional cross section may be sorted into the array of ion channels 216, such that ions 220 in an ion channel have a different range of ion mobilities from ions 220** in an adjacent ion channel.

In various examples, ion channels 216 may include ion traps, RF ion guides, DC ion lenses, or a combination thereof. In some examples, ion channels 216 may include ion traps each defined by a plurality of rod electrodes. Additionally, each ion trap may include one or more drag vanes. In certain examples, adjacent ion traps in the array of ion traps may share a pair of rods.

In various examples, the plurality of ion channels 216 may include between about 3 ion channels and about 50 ion channels, such as between about 5 ion channels and about 20 ion channels, or between about 7 ion channels and about 15 ions channels.

In various examples, a lens array (not shown) may be positioned between ion exit orifices 218 and ion channels 216. The lens array may be configured to guide ions 220 into the respective channel, such as by focusing ions 220 towards the centerline of the channel.

A cooling/transfer guide 222 may be located adjacent to the plurality of ion channels 216. Ions 220 may be ejected (e.g., in packets) from ion channels 216 into cooling/transfer guide 222. From cooling/transfer guide 222, ions 220 may be directed to mass analyzer 104. Ions 220 may be ejected from channels 216 in response to control signals received from an ion pulse control system 224 ("control system 224"). Additionally, control system 224 may be configured to obtain signal 226 (e.g., an electrical signal) generated by mass analyzer 104 (e.g., an ion detector) based on the ejected ions 220. Operations of control system 224 will be described below in more detail. In various examples, ions 220 may be directed to other processes, such as a fragmentation cell (not shown), prior to mass analyzer 104.

Figure 3:
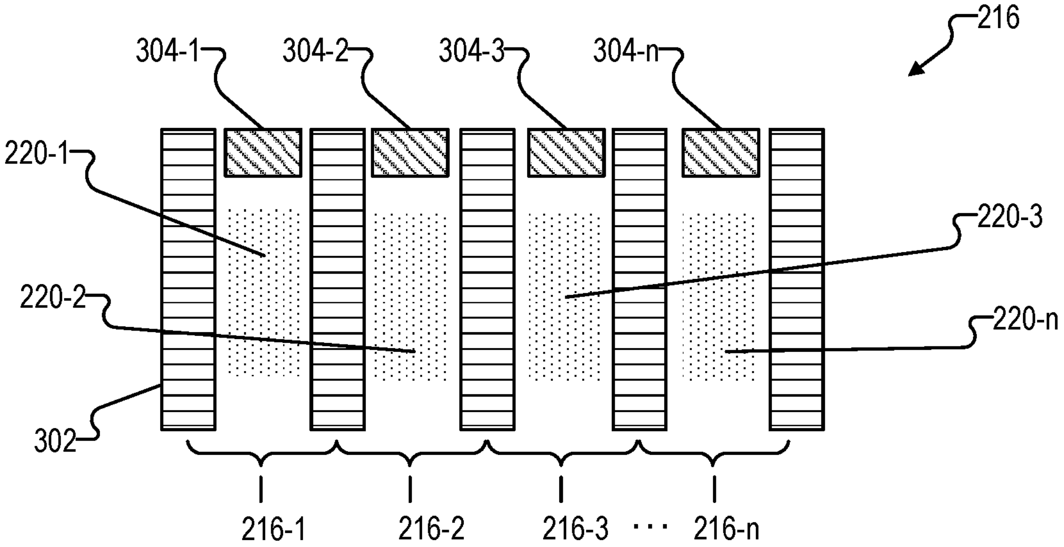
FIG. 3 shows an enlarged portion of the functional diagram of FIG. 2 including an array of channels of the ion mobility separator.

FIG. 3 shows an expanded view of the plurality of channels 216 (e.g., channels 216-1 through **216-*n*) of ion mobility separator 202. As shown, channels 216 are arranged in an array that may be separated by rods 302. Each channel 216 comprises a respective outlet gate electrode 304 (e.g., electrodes 304-1 through 304-*n*). Outlet gate electrodes 304 may be used to control which packets of accumulated ions 220 are ejected to mass analyzer 104 at any particular time. Each outlet gate electrode 304 may be separate, as is illustrated, from its associated ion channel 216. However, in some instances, an outlet gate electrode 304 may be a specific ring or plate electrode of an ion channel 216 that is electrically configured to be supplied, at certain controlled times, with a unique electrical potential that can halt the flow of ions 220 (e.g., to accumulate ions 220 within channels 216) and, at certain other times, with an electric potential that permits the flow of ions 220 (e.g., to eject ions 220 from channels 216**).

Each channel 216 may be configured to accumulate a subset of ions 220 transmitted through ion mobility separator 202 based on the ion mobility of ions 220. For example, a first channel 216-1 may be configured to accumulate a first subset of ions 220-1 having a first range of ion mobilities within first channel 216-1, a second channel 216-2 may be configured to accumulate a second subset of ions 220-2 having a second range of ion mobilities within second channel 216-2, a third channel 216-3 may be configured to accumulate a third subset of ions 220-3 having a third range of ion mobilities within third channel 216-3, and so on. Accordingly, channels 216 may separate ions 220 spatially to allow only one or a few types of ions 220 to be directed to mass analyzer 104 at a time while accumulating multiple groups of ions 220 that may be stored in channels 216 and subsequently ejected toward mass analyzer 104. The ejections from channels 216 may allow mass analyzer 104 to perform mass analysis of an ion packet discharged from a selected one or a selected subset of channels 216 while other ions 220 continue to accumulate in others of channels 216. In some implementations, the potential gain provided by ion mobility separator 202 may be equal to the number of separate channels 216.

In some implementations, each channel of the plurality of channels 216 may be controlled independently of one another (e.g., by control system 224). This may permit the selective ejection of ions 220 toward mass analyzer 104 (through the ion cooling/transfer guide 222) of accumulated ions 220 of some of channels 216, while, at the same time, ions 220 may be continuously accumulated in others. Further, each channel 216 may accumulate and temporarily trap at least one packet of ions 220 therein while, at the same, releasing an earlier accumulated packet of ions 220 to ion cooling/transfer guide 222. The cycle times of the various channels 216 may not all be identical. In some examples, different pre-determined cycle times may be used to accumulate different ion species for periods of time that are in inverse relationship to their relative abundances in a sample.

Other configurations for ion mobility separator 202 and/or channels 216 may be used. For example, ion mobility separator 202 may be disposed along an ion pathway between ion source 102 and mass analyzer 104, wherein the ion pathway is straight, curved, and/or tortuous. In some examples, ion mobility cell 204 may be replaced by any device that provides a stream of ions 220, the composition of which varies with time. Additionally or alternatively, ion mobility separator 202 may be based on principles different from ion mobility in gases. For example, the separation may be accomplished based on ion m/z or charge state. The separation mechanism may be due to competition of forces acting on ions which is known in the art to be m/z or z dependent. One such example involves the action of pseudopotential force emerging in non-uniform periodic electric fields. Fractions of ions 220 may be trapped in individual channels 216 and analyzed sequentially without exceeding capacity of mass analyzer 104 thus increasing selectivity. The analytical duty cycle may be enhanced because accumulation in traps is continuous for multiple fractions while only one or a subset of them is delivered into mass analyzer 104.

Figure 4:
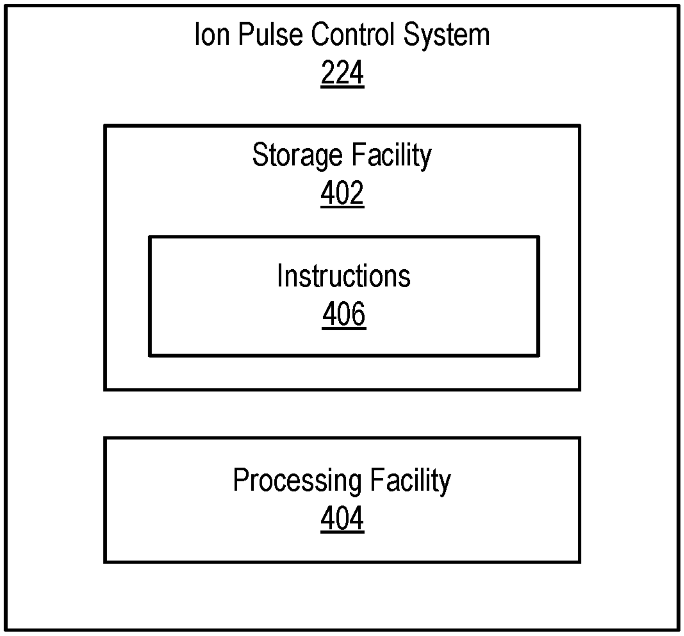
FIG. 4 shows an illustrative functional diagram of an ion pulse control system.

FIG. 4 shows an illustrative functional diagram of control system 224. Control system 224 may be implemented separately from mass spectrometer 100. In some examples, control system 224 may be implemented entirely or in part by mass spectrometer 100 (e.g., by controller 106 or any other component of mass spectrometer 100) and/or by ion mobility separator 202.

Control system 224 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data acquired, received, generated, managed, used, and/or transmitted by processing facility 404. For example, storage facility 402 may maintain signal 226 and/or Hadamard algorithm data. Hadamard algorithm data may include data representative of, used by, or associated with one or more Hadamard algorithms maintained by processing facility 404 for operating channels 216 of ion mobility separator 202 and/or determining a signal associated with ions ejected from a channel 216 of ion mobility separator 202.

Processing facility 404 may be configured to perform (e.g., execute instructions 406 stored in storage facility 402 to perform) various processing operations described herein. It will be recognized that the operations and examples described herein are merely illustrative of the many different types of operations that may be performed by processing facility 404. In the description herein, any references to operations performed by control system 224 may be understood to be performed by processing facility 404 of control system 224. Furthermore, in the description herein, any operations performed by control system 224 may be understood to include control system 224 directing or instructing another system or device to perform the operations.

In some examples, control system 224 may control channels 216 of ion mobility separator 202, such as by controlling outlet gate electrodes 304 to selectively open or close channels 216 for a plurality of ion pulses to reduce the quantity of accumulated ions between ejections.

Figure 5:
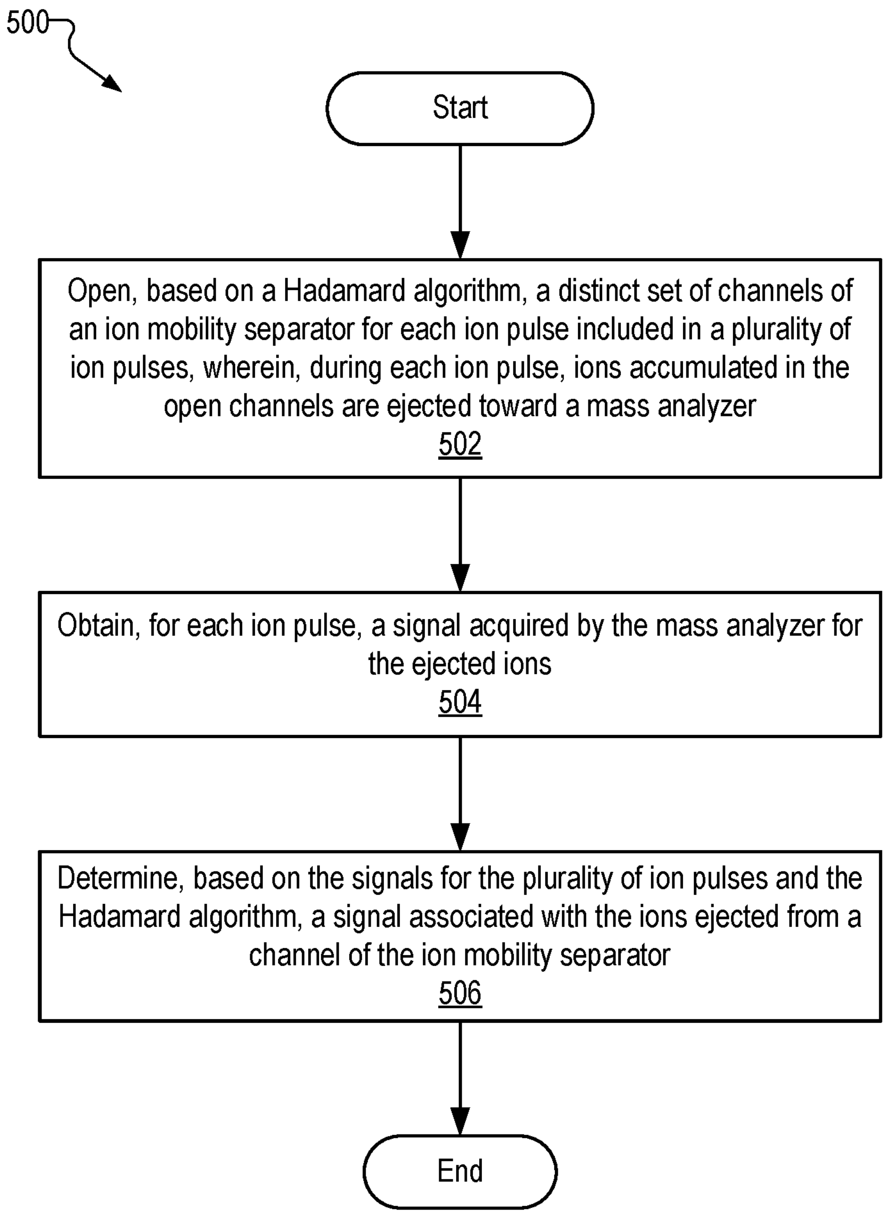
FIG. 5 shows a flowchart of an illustrative method for controlling an ion mobility separator based on a Hadamard algorithm.

FIG. 5 shows a flowchart of an illustrative method 500 for controlling an ion mobility separator (e.g., ion mobility separator 202) based on a Hadamard algorithm. While FIG. 5 shows illustrative operations according to one example, other examples may omit, add to, reorder, and/or modify any of the operations shown in FIG. 5. While FIG. 5 describes operations performed by control system 224, any of the operations may alternatively be performed by mass spectrometer 100, ion mobility separator 202, and/or any other apparatus.

In operation 502, control system 224 may open, based on a Hadamard algorithm, a distinct set of channels of an ion mobility separator comprising a plurality of channels (e.g., channels 216) for each ion pulse included in a plurality of ion pulses. During each ion pulse of the plurality of ion pulses, ions accumulated in the open channels are ejected toward a mass analyzer (e.g., mass analyzer 104).

An ion pulse is a period of time during which one or more packets of ions are ejected from the distinct set of channels of the ion mobility separator. During each ion pulse, control system 224 may control the ion mobility separator to open the distinct set of channels, such as by providing outlet gate electrodes (e.g., outlet gate electrodes 304) associated with the distinct set of channels with an electric potential that permits the flow of ions from the channels. The remaining channels of the plurality of channels (e.g., outside of the distinct set of channels) remain closed to prevent ions accumulated in the remaining channels from being ejected during the ion pulse. In some examples, control system 224 may provide the outlet gate electrodes associated with the distinct set of channels with an electric potential that closes the channels (e.g., halts the flow of ions from the channels), such as between and/or after each ion pulse. Alternatively, control system 224 may, in some instances, allow one or more channels of the distinct set of channels to remain open after an ion pulse, such as when the one or more channels may be determined to be open for a subsequent ion pulse of the plurality of ion pulses. In some implementations, a duration of one or more ion pulses of the plurality of ion pulses may vary (e.g., one or more ion pulses may have a longer and/or shorter duration than another ion pulse of the plurality of ion pulses).

In a Hadamard algorithm, control system 224 may control the ion mobility separator to open the distinct set of channels in sequences of ion pulses that are orthogonal to each other so that signals associated with ions ejected from each channel of the ion mobility separator may be acquired in parallel and subsequently deconvolved. The opening the distinct set of channels based on the Hadamard algorithm may include opening two or more channels of the plurality of channels for each ion pulse of the plurality of ion pulses. For example, two or more channels may be opened simultaneously during an ion pulse, such as to allow ions accumulated within the two or more channels to be ejected toward the mass analyzer simultaneously. The opening the distinct set of channels based on the Hadamard algorithm may include opening all channels of the plurality of channels for a reference ion pulse. For example, all channels of the ion mobility separator may be opened simultaneously during the reference ion pulse, such as to allow ions accumulated within all of the channels to be ejected toward the mass analyzer simultaneously.

The opening the distinct set of channels based on the Hadamard algorithm may include opening each channel of the plurality of channels for at least about 50 percent of the plurality of ion pulses. For example, each channel of the plurality of channels may be open for at least half of the plurality of ion pulses and/or half the duration of the ejection of ions toward the mass analyzer. As another example, opening the distinct set of channels based on the Hadamard algorithm may include opening each channel of the plurality of channels for at least about 50 percent of an amount of time that the plurality of channels are open for the plurality of ion pulses.

In some examples, the opening of the distinct set of channels in sequences of ion pulses may be performed based on a Hadamard matrix. FIG. 7A shows an illustrative implementation 700 of a Hadamard matrix that includes a plurality of columns 702 (e.g., columns 702-1 through 702-4) and rows (e.g., rows 704-1 through 704-4) associated with elements 706. Each element 706 of Hadamard matrix 700 includes a binary value (e.g., "1" or "−1") such that a sum of the values of all elements 706 within one or more rows 704 of Hadamard matrix 700 equals zero. Ion channels of the ion mobility separator may be controlled based on Hadamard matrix 700, such as by assigning each column 702 to a distinct channel of the ion mobility separator and assigning each row 704 to a distinct ion pulse of the plurality of ion pulses. Accordingly, channels associated with a value of 1 may be open during the corresponding ion pulse and channels associated with a value of −1 may be closed during the corresponding ion pulse (see, e.g., FIG. 7B). FIG. 7A and further examples of opening a distinct set of channels of the ion mobility separator based on a Hadamard matrix will be discussed in more detail below.

Referring again to FIG. 5, in operation 504, control system 224 may obtain, for each ion pulse of the plurality of ion pulses, a signal (e.g., signal 226) acquired by the mass analyzer for the ejected ions. To illustrate, ions ejected from the distinct set of channels of the ion mobility separator for each ion pulse may be detected by the mass analyzer (e.g., an ion detector), such as to detect ions at a variety of different m/z and responsively generate the signal. For example, the signal may include an electrical signal representative of ion intensities of the ions ejected from the distinct set of channels for the corresponding ion pulse. The signal may be obtained for each ion pulse such that control system 224 may be configured to obtain a plurality of signals for the plurality of ion pulses.

In some instances, the signal may be transmitted to a controller (e.g., controller 106) of the mass analyzer and/or a mass spectrometer (e.g., mass spectrometer 100) for processing. In such instances where the signal is transmitted to the controller, control system 224 may be configured to obtain the signal from the controller. Additionally or alternatively, control system 224 may be configured to obtain the signal from the mass analyzer. In some examples, control system 224 may be configured to direct the mass analyzer and/or the mass spectrometer to acquire the signal, such as for each ion pulse.

In operation 506, control system 224 may determine, based on the signals for the plurality of ion pulses and the Hadamard algorithm, a signal associated with the ions ejected from a select channel of the ion mobility separator. For example, it may be desirable to determine an ion intensity associated with ions ejected from a select channel of the ion mobility separator (e.g., to construct a mass spectrum for the subset of ion mobilities included in the ejected ions). To determine the signal associated with ions ejected from the select channel, the signals acquired by the mass analyzer for the plurality of ion pulses may be deconvolved to isolate the signal associated with the ions ejected from the select channel during the plurality of ion pulses. Deconvolving the signals may include adding the signals acquired by the mass analyzer for each ion pulse of the plurality of ions pulses that the select channel is open and subtracting the signals acquired by the mass analyzer for each ion pulse of the plurality of ion pulses that the select channel is closed. In some implementations, the select channel may include a single channel of the plurality of channels and/or a subset of channels of the plurality of channels. Methods for deconvolving the signals will be described below in more detail.

In some examples, the determined signal associated with ions ejected from the select channel may be used to generate a mass spectrum representative of an intensity of the ions as a function of m/z. For example, a mass spectrum may be generated based on ions ejected from one or more channels of the ion mobility separator. Control system 224 may be configured to generate the mass spectrum and/or control system 224 may be configured to output the determined signal to the controller (e.g., controller 106) of a mass spectrometer for generating the mass spectrum.

Figure 6:
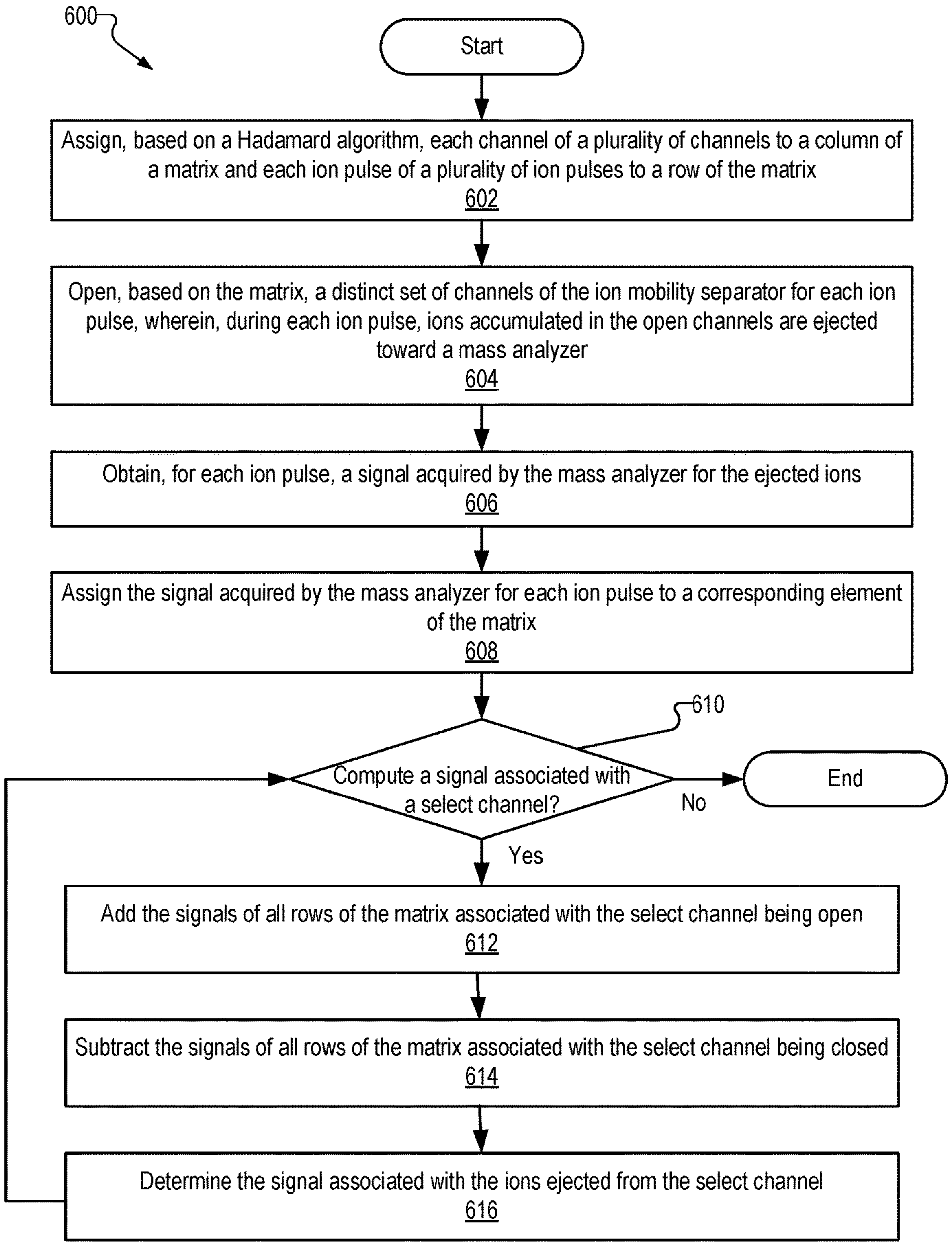
FIG. 6 shows a flowchart of another illustrative method for controlling an ion mobility separator based on a Hadamard algorithm.

FIG. 6 shows a flowchart of another illustrative method 600 for controlling an ion mobility separator based on a Hadamard algorithm. While FIG. 6 shows illustrative operations according to one example, other examples may omit, add to, reorder, and/or modify any of the operations shown in FIG. 6. While FIG. 6 describes operations performed by control system 224, any of the operations may alternatively be performed by mass spectrometer 100, ion mobility separator 202, and/or any other apparatus.

In operation 602, control system 224 may assign, based on a Hadamard algorithm, each channel of a plurality of channels of the ion mobility separator to a column of a Hadamard matrix and each ion pulse of the plurality of ion pulses to a row of the Hadamard matrix. As mentioned above, the Hadamard matrix indicates whether each channel is open (e.g., to allow the flow of ions) or closed (e.g., to prevent the flow of ions) for each ion pulse of the plurality of ion pulses. For example, each element of the Hadamard matrix may be assigned a value that may be representative of whether a channel is open or closed for a corresponding ion pulse. In some examples, the value may include a term (e.g., "open" for open or "closed" for closed), an integer (e.g., "1" for open or "0" for closed), and/or any other type of value representative of a channel being open or closed.

In operation 604, control system 224 may open, based on the Hadamard matrix, a distinct set of channels of the ion mobility separator for each ion pulse, wherein, during each ion pulse, ions accumulated in the open channels are ejected toward a mass analyzer. To illustrate, for each ion pulse, the opening the distinct set of channels may include opening each channel associated with an element of the Hadamard matrix having a value representative of the channel being open within the row of the Hadamard matrix corresponding to the ion pulse. The opening the distinct set of channels may further include abstaining from opening each channel associated with an element of the Hadamard matrix having a value representative of the channel being closed within the row of the Hadamard matrix corresponding to the ion pulse.

The Hadamard matrix may include a square binary matrix such that the rows of the Hadamard matrix are mutually orthogonal (e.g., each pair of rows have matching elements in half of their columns and nonmatching elements in the remaining columns). To illustrate, the Hadamard matrix $H_n$ having an order of n (e.g., n elements per row and n elements per column) may satisfy $H_nH_n^T=nI_n$, where $H_n^T$ is the transpose of $H_n$ and $I_n$ is the identity matrix of order n. The Hadamard matrix may be normalized in some instances, such as when all of the elements of the first row and the first column are equal to +1. The order n of the Hadamard matrix may include an order of one, two, or a multiple of four. Accordingly, in instances where the matrix includes a Hadamard matrix, the number of ion pulses of the plurality of ion pulses may be a multiple of four. Moreover, the maximum number of channels of the plurality of channels of the ion mobility separator may include one less than the number of ion pulses of the plurality of ion pulses.

In operation 606, control system 224 may obtain, for each ion pulse of the plurality of ion pulses, a signal acquired by the mass analyzer for the ejected ions. To illustrate, control system 224 may obtain the signal generated by the mass analyzer (e.g., an ion detector) in response to detecting ions ejected from the open channels of the ion mobility separator for each ion pulse. The signal may include an electrical signal representative of ion intensities of the ions ejected from the open channels for the corresponding ion pulse. The signal may be obtained for each ion pulse such that control system 224 may be configured to obtain a plurality of signals for the plurality of ion pulses.

In operation 608, control system 224 may assign the signal acquired by the mass analyzer for each ion pulse to a corresponding element of the Hadamard matrix. For example, the signal acquired by the mass analyzer for each ion pulse may include a total signal value (e.g., representative of ion intensities) associated with all of the ions ejected from the distinct set of channels of the ion mobility separator during the ion pulse. The total signal value for each ion pulse may be assigned to the corresponding element in the row associated with the ion pulse having a value representative of the channel being open for the ion pulse. In some implementations, the assigning the signal acquired by the mass analyzer for each ion pulse may further include assigning a value of "0" to each element in the row associated with the ion pulse having a value representative of the channel being closed for the ion pulse.

In operation 610, control system 224 may determine whether to compute a signal associated with ions ejected from a select channel of the ion mobility separator. In some examples, the determining whether to compute the signal associated with ions ejected from the select channel may be based on one or more factors, such as whether the signal was previously computed for the select channel, detecting a user input designating computing the signal associated with ions ejected from the select channel, etc. As an illustrative example, a user input designating computing the signal may be received by control system 224 from a user interface (e.g., included and/or provided by control system 224 and/or controller 106) that may be configured to enable interaction between a user of the ion mobility separator and control system 224.

If control system 224 does determine to compute the signal associated with ions ejected from the select channel (yes, at operation 610), control system 224 may, at operation 612, add the signals of all rows of the Hadamard matrix associated with the select channel of the ion mobility separator being open and, at operation 614, subtract the signals of all rows of the Hadamard matrix associated with the select channel of the ion mobility separator being closed. To illustrate, the signal values assigned to each element in a column may be summed for all rows of the Hadamard matrix in which the select channel was open and the signal values assigned to each element in the column may be subtracted for all rows of the Hadamard matrix in which the select channel was closed. This may cancel the signals acquired by the mass analyzer that correspond to ions ejected from other channels (e.g., ions not ejected from the select channel).

In operation 616, control system 224 may further determine the signal associated with the ions ejected from the select channel. For example, the addition of the signals acquired by the mass analyzer for the ion pulses in which the select channel was open and the subtraction of the signals acquired by the mass analyzer for the ion pulses in which the select channel was closed may result in a cumulative signal value associated with the ions ejected from the select channel for the all of the ion pulses in which the select channel was open. To illustrate, the cumulative signal value may be a multiple of the signal associated with the ions ejected from the select channel for each ion pulse such that the cumulative signal value may be further processed (e.g., the cumulative signal value may be divided by the number of ion pulses that the select channel was open) to determine the signal associated with the ions ejected from the select channel for each ion pulse.

After the signal associated with the ions ejected from the select channel is determined, control system 224 returns to operation 610 to determine whether to compute a signal associated with ions ejected from a select channel of the ion mobility separator. For example, control system 224 may determine to compute the signal associated with ions ejected from another select channel. Alternatively, if control system 224 does not determine to compute the signal associated with ions ejected from the select channel (no, at operation 610), control system 224 may end determining signals associated with ions ejected from the channels of the ion mobility separator.

FIG. 7A shows an illustrative implementation 700 of a Hadamard matrix that may be used for controlling an ion mobility separator (e.g., ion mobility separator 202). As shown, Hadamard matrix 700 comprises a plurality of columns 702 (e.g., columns 702-1 through 702-4) and a plurality of rows 704 (e.g., rows 704-1 through 704-4). The number of columns 702 and rows 704 of Hadamard matrix 700 are equal such that Hadamard matrix 700 is a square matrix. For example, the order of Hadamard matrix 700 is four such that Hadamard matrix 700 includes four columns and four rows. Moreover, each element 706 of Hadamard matrix 700 includes a binary value (e.g., "1" or "−1"). Hadamard matrix 700 is normalized, wherein, other than a first column 702-1 and a first row 704-1, rows 704 are mutually orthogonal such that the values of all elements 706 within the remaining rows 704 add to zero. Still other suitable configurations of Hadamard matrix 700 may be used. For example, columns 702 and/or rows 704 of matrix may be arranged in any other order or sequence.

FIG. 7B shows an illustrative implementation 708 of a matrix in which columns 710 (e.g., columns 710-1 through 710-3) of matrix 708 are assigned a channel of a plurality of channels of the ion mobility separator and rows 712 (e.g., rows 712-1 through 712-4) of matrix 708 are assigned an ion pulse of a plurality of ion pulses. As shown, matrix 708 includes three columns 710 associated with three channels of the ion mobility separator and four rows 712 associated with four ion pulses. Elements 714 of matrix 708 may include a value (e.g., "Open" or "Closed") representative of whether each channel of the corresponding column 710 is open or closed for a corresponding ion pulse of rows 712. This may allow each row 712 of matrix 708 to indicate whether each channel is open or closed for each ion pulse of the plurality of ion pulses.

In the illustrated example, the values assigned to elements 714 are based on Hadamard matrix 700 of FIG. 7A such that the distinct set of channels are open for each ion pulse according to the Hadamard matrix. For example, elements 714 may be assigned a value of "Open" for corresponding elements 706 having a value of "1" and the remaining elements 714 may be assigned a value of "Closed" for corresponding elements 706 having a value of "−1". As shown, the distinct set of channels associated with a first row 712-1 of matrix 708 includes each channel of columns 710 such that all channels of the plurality of channels are open for a first ion pulse associated with the first row 712-1 of matrix 708 (e.g., a reference ion pulse). However, the order of ion pulses associated with rows 712 may be arranged in any order such that the plurality of channels may be open in any of the ion pulses associated with rows 712. Matrix 708 further provides that each channel of the plurality of channels is determined to be open for at least 50 percent of the plurality of ion pulses.

Figure 8A:
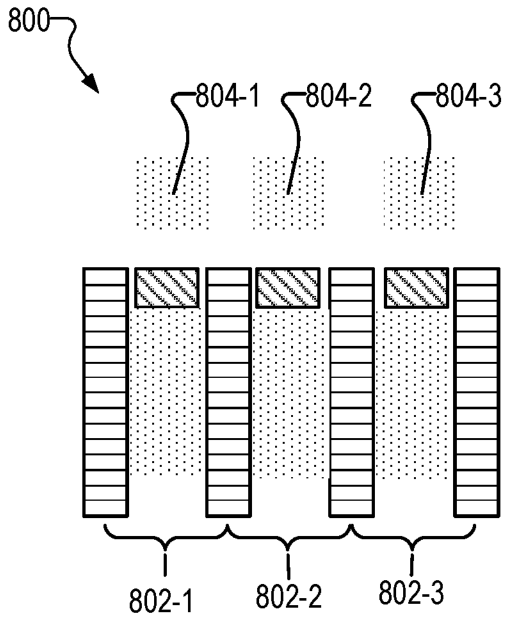
FIGS. 8A-8D show a simulated progression of controlling an ion mobility separator based on the implementation of FIG. 7B.

FIGS. 8A-8D show a simulated progression of performing ion ejections based on matrix 708 of FIG. 7B. For example, FIG. 8A shows an illustrative implementation 800 of a first ion pulse associated with the first row 712-1 of matrix 708 in which all channels 802 (e.g., channels 802-1 through 802-3) of an ion mobility separator are determined to be open. Channels 802 may be implemented by or similar to channels 216 of ion mobility separator 202. As shown, a first channel 802-1 may be associated with a first column 710-1 of matrix 708 such that the first channel 802-1 is open for the first ion pulse to allow a first packet of ions 804-1 to be ejected from the first channel 802-1. A second channel 802-2 may be associated with a second column 710-2 of matrix 708 such that the second channel 802-2 is open for the ion first pulse to allow a second packet of ions 804-2 to be simultaneously ejected from the second channel 802-2. A third channel 802-3 may be associated with a third column 710-3 of matrix 708 such that the third channel 802-3 is open for the first ion pulse to allow a third packet of ions 804-3 to be simultaneously ejected from the third channel 802-3.

Figure 8B:
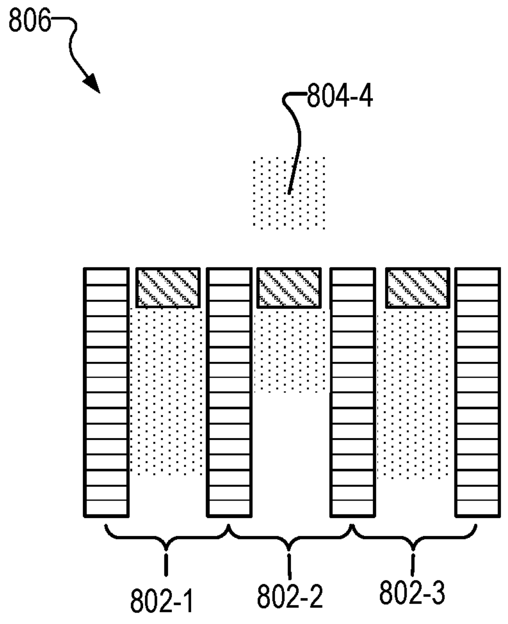
Figure 8C:
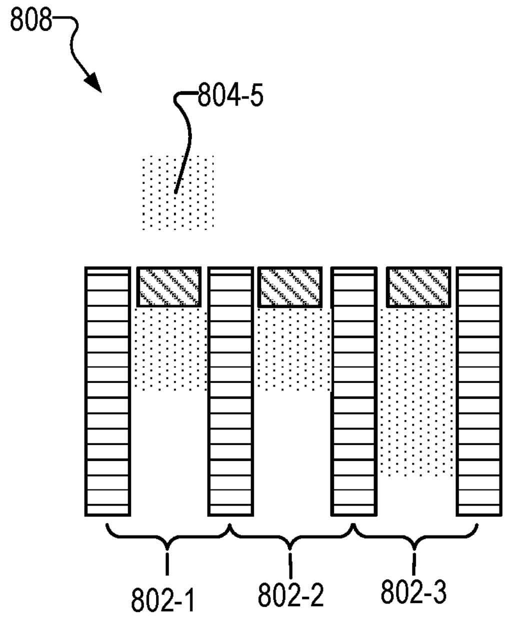
Figure 8D:
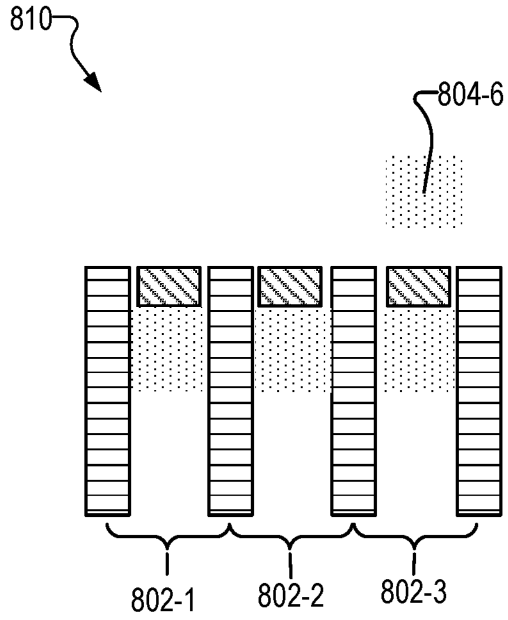

FIG. 8B shows an illustrative implementation 806 of a second ion pulse associated with second row 712-2 of matrix 708 such that the second channel 802-2 is open during the second ion pulse to allow a fourth packet of ions 804-4 to be ejected from the second channel 802-2 while the first channel 802-1 and the third channel 802-3 are closed. FIG. 8C shows an illustrative implementation 808 of a third ion pulse associated with third row 712-3 of matrix 708 such that the first channel 802-1 is open during the third ion pulse to allow a fifth packet of ions 804-5 to be ejected from the first channel 802-1 while the second channel 802-2 and the third channel 802-3 are closed. FIG. 8D shows an illustrative implementation 810 of fourth ion pulse associated with fourth row 712-4 of matrix 708 such that the third channel 802-3 is open during the fourth ion pulse to allow a sixth packet of ions 804-6 to be ejected from the third channel 802-3 while the first channel 802-1 and the second channel 802-2 are closed.

Ions 804 may be ejected from channels 802 toward a mass analyzer (e.g., mass analyzer 104) such that a signal may be acquired by the mass analyzer for the ejected ions 804. For example, a signal may be acquired by the mass analyzer for each ion pulse of the four ion pulses depicted in FIGS. 8A-8D such that the mass analyzer may acquire four signals associated with the ejected ions 804. The signals acquired by the mass analyzer may be used to determine a signal associated with ions 804 ejected from one or more channels 802 of the ion mobility separator, such as for each ion pulse.

As an illustrative example, FIG. 9A shows an illustrative implementation 900 of a matrix for determining a signal associated with a channel 802 based on matrix 708 of FIG. 7B. As shown, matrix 900 includes a plurality of columns 902 (e.g., columns 902-1 through 902-3) corresponding to columns 710 of matrix 708 and a plurality of rows 904 (e.g., rows 904-1 through 904-4) corresponding to rows 712 of matrix 708. A total signal value representative of a signal acquired by the mass analyzer for each ion pulse may be assigned to each element 906 of matrix 900 associated with a channel 802 being open (e.g., corresponding to elements 714 of matrix 708 having a value of "Open"). Additionally, a value of "0" may be assigned to each element 906 of matrix 900 associated with a channel 802 being closed (e.g., corresponding to elements 714 of matrix 708 having a value of "Closed").

FIG. 9B shows another illustrative implementation 908 of matrix 900 of FIG. 9A for deconvolving the signals to determine the signal associated with ions ejected from a select channel 802 (e.g., first channel 802-1) of the ion mobility separator. As shown, elements 906 of all rows 904 associated with ion pulses in which the first channel 802-1 is open are added and elements 904 of all rows 904 associated with ion pulses in which the first channel 802-1 is closed are subtracted. For example, the first channel 802-1 was open during the first pulse and the third pulse, so elements 906 associated with a first row 904-1 and a third row 904-3 are added (e.g., "+ Signal"). The first channel 802-1 was closed during the second pulse and the fourth pulse, so elements 906 associated with a second row 904-2 and a fourth row 904-4 are subtracted (e.g., "− Signal").

Adding and subtracting the signals in this manner results in the signals associated with ions 804 ejected from the first channel 802-1 being isolated from the signals associated with ions 804 ejected from the second channel 802-2 and the third channel 802-3. For example, the addition of the first row 904-1 and the third row 904-2 and the subtraction of the second row 904-2 and the fourth row 904-4 results in a cumulative signal value of twice the signal acquired by the mass analyzer for the first column 902-1 associated with the first channel 802-1. The addition of the first row 904-1 and the third row 904-2 and the subtraction of the second row 904-2 and the fourth row 904-4 results in value of "0" for the second column 902-2 and the third column 902-3 associated with the second channel 802-2 and the third channel 802-3 (e.g., such that signals associated with the second channel 802-2 and the third channel 802-3 are cancelled). In some implementations, the signal associated with ions 804 ejected from the first channel 802-1 for each ion pulse (e.g., each row 904) is determined by dividing the cumulative signal value by the number of ion pulses that the first channel 802-1 was open (e.g., two).

In some examples, such calculations may be repeated for one or more other channels 802 of the ion mobility separator. For example, to determine the signal associated with ions 804 ejected from the second channel 802-2, the first row 904-1 associated with the first ion pulse and the second row 904-2 associated with the second ion pulse are added while the third row 904-3 and the fourth row 904-4 are subtracted. Similarly, to determine the signal associated with ions 804 ejected from the third channel 802-3, the first row 904-1 associated with the first ion pulse and the fourth row 904-4 associated with the fourth ion pulse are added while the second row 904-2 and the third row 904-3 are subtracted. Still other suitable configurations for determining the signal associated with ions 804 ejected from a channel 802 of an ion mobility separator may be used.

To illustrate, in some examples, the ion mobility separator includes a larger number of channels such that additional ion pulses may be performed. As an example, FIG. 10A shows an implementation 1000 of a matrix including a Hadamard matrix having eight columns 1002 (e.g., columns 1002-1 through 1002-8) and eight rows 1004 (e.g., rows 1004-1 through 1004-8). FIG. 10B further shows an illustrative implementation 1006 of a matrix in which columns 1010 (e.g., columns 1010-1 through 1010-7) of the matrix are assigned a channel of a plurality of channels of an ion mobility separator and rows 1012 (e.g., rows 1012-1 through 1012-8) of the matrix are assigned an ion pulse of a plurality of ion pulses based on the matrix of FIG. 10A. As shown, the matrix includes seven columns 1010 associated with seven channels of the ion mobility separator and eight rows 1012 associated with eight ion pulses. A distinct set of channels may be open or closed for each ion pulse based on the corresponding Hadamard matrix. In some examples, the distinct set of channels may be open or closed based on any order or sequence of columns 1002 and/or rows 1004 of Hadamard matrix 1000. Additionally, the signal associated with a channel of the plurality of channels may be determined based on the corresponding Hadamard matrix. Still additional Hadamard matrices having increased orders in multiples of four may be used for controlling an ion mobility separator.

In certain examples, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
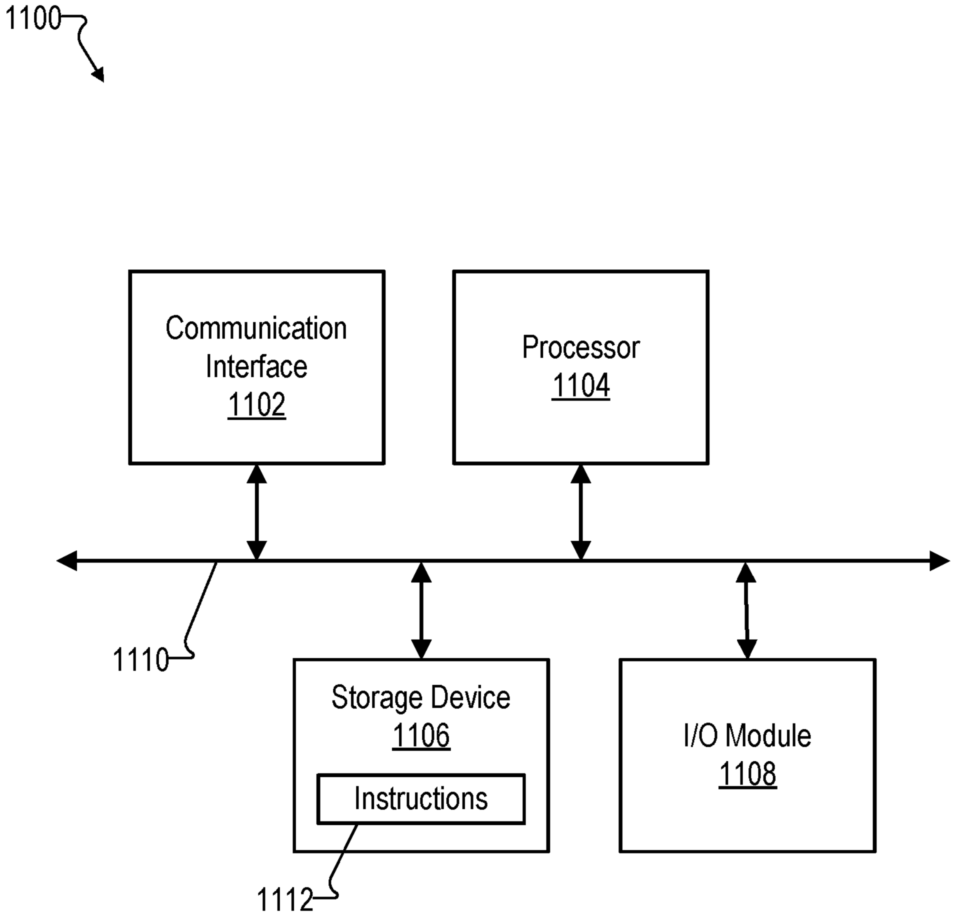
FIG. 11 shows an illustrative computing device.

FIG. 11 shows an illustrative computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected one to another via a communication infrastructure 1110. While an illustrative computing device 1100 is shown in FIG. 11, the components illustrated in FIG. 11 are not intended to be limiting. Additional or alternative components may be used in other examples. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data and/or interpreting, executing, and/or directing execution of one or more of the instructions, processes, and/or operations described herein. Processor 1104 may perform operations by executing computer-executable instructions 1112 (e.g., an application, software, code, and/or other executable data instance) stored in storage device 1106.

Storage device 1106 may include one or more data storage media, devices, or configurations and may employ any type, form, and combination of data storage media and/or device. For example, storage device 1106 may include, but is not limited to, any combination of the non-volatile media and/or volatile media described herein. Electronic data, including data described herein, may be temporarily and/or permanently stored in storage device 1106. For example, data representative of computer-executable instructions 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain examples, I/O module 1108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1100. For example, storage facility 402 may be implemented by storage device 1106, and processing facility 404 may be implemented by processor 1104.

It will be recognized by those of ordinary skill in the art that while, in the preceding description, various illustrative examples have been described with reference to the accompanying drawings. It will, however, be evident that various modifications and changes may be made thereto, and additional examples may be implemented, without departing from the scope of the invention as set forth in the claims that follow. For example, certain features of one example described herein may be combined with or substituted for features of another example described herein. The description and drawings are accordingly to be regarded in an illustrative rather than a restrictive sense.

What is claimed is:

1. A system comprising:

one or more processors; and memory storing executable instructions that, when executed by the one or more processors, cause a computing device to:

open, based on a Hadamard algorithm, a distinct set of channels of an ion mobility separator comprising a plurality of channels for each ion pulse included in a plurality of ion pulses, wherein, during each ion pulse of the plurality of ion pulses, ions accumulated in the open channels are ejected toward a mass analyzer;

obtain, for each ion pulse of the plurality of ion pulses, a signal acquired by the mass analyzer for the ejected ions; and determine, based on the signals for the plurality of ion pulses and the Hadamard algorithm, a signal associated with the ions ejected from a channel of the ion mobility separator.

2. The system of claim 1, wherein the opening the distinct set of channels based on the Hadamard algorithm includes opening two or more channels of the plurality of channels for each ion pulse of the plurality of ion pulses.

3. The system of claim 1, wherein the opening the distinct set of channels based on the Hadamard algorithm includes opening all channels of the plurality of channels for an ion pulse of the plurality of ion pulses.

4. The system of claim 1, wherein the opening the distinct set of channels based on the Hadamard algorithm includes opening each channel of the plurality of channels for 50 percent of the plurality of ion pulses.

5. The system of claim 1, wherein the determining the signal based on the Hadamard algorithm includes deconvolving the signals acquired by the mass analyzer for the plurality of ion pulses to isolate the signal associated with the ions ejected from the channel of the ion mobility separator.

6. The system of claim 5, wherein the deconvolving the signals includes adding the signals acquired by the mass analyzer for each ion pulse of the plurality of ions pulses that the channel is open and subtracting the signals acquired by the mass analyzer for each ion pulse of the plurality of ion pulses that the channel is closed.

7. The system of claim 1, wherein the opening the distinct set of channels based on the Hadamard algorithm includes assigning each channel of the plurality of channels to a column of a matrix and each ion pulse of the plurality of ion pulses to a row of the matrix such that each row of the matrix indicates whether each channel was open or closed for each ion pulse.

8. The system of claim 7, wherein the matrix comprises a Hadamard matrix.

9. The system of claim 7, wherein the determining the signal based on the Hadamard algorithm comprises assigning the signal acquired by the mass analyzer for each ion pulse to each element of the matrix associated with open channels for the corresponding ion pulse.

10. The system of claim 9, wherein the determining the signal based on the Hadamard algorithm further comprises adding the signals of all rows of the matrix associated with a select channel of the ion mobility separator being open and subtracting the signals of all rows of the matrix associated with the select channel of the ion mobility separator being closed.

11. The system of claim 1, wherein a number of ion pulses of the plurality of ion pulses is a multiple of four.

12. The system of claim 1, wherein a number of ion pulses of the plurality of ion pulses is greater than a number of channels of the ion mobility separator.

13. The system of claim 1, wherein the instructions further cause the computing device to generate, based on the signal associated with the ions ejected from the channel of the ion mobility separator, a mass spectrum representative of an intensity of the ions as a function of mass-to-charge ratio of the ions.

14. A non-transitory computer-readable medium storing instructions that, when executed, direct at least one processor of a computing device to:

control an ion mobility separator to open, based on a Hadamard algorithm, a distinct set of channels of the ion mobility separator comprising a plurality of channels for each ion pulse included in a plurality of ion pulses, wherein, during each ion pulse of the plurality of ion pulses, ions accumulated in the open channels are ejected toward a mass analyzer;

obtain, for each ion pulse of the plurality of ion pulses, a signal acquired by the mass analyzer for the ejected ions; and determine, based on the signals for the plurality of ion pulses and the Hadamard algorithm, a signal associated with the ions ejected from a channel of the ion mobility separator.

15. The computer-readable medium of claim 14, wherein the controlling the ion mobility separator based on the Hadamard algorithm includes controlling the ion mobility separator to open two or more channels of the plurality of channels for each ion pulse of the plurality of ion pulses.

16. The computer-readable medium of claim 14, wherein the controlling the ion mobility separator based on the Hadamard algorithm includes controlling the ion mobility separator to open all channels of the plurality of channels for an ion pulse of the plurality of ion pulses.

17. The computer-readable medium of claim 14, wherein the controlling the ion mobility separator based on the Hadamard algorithm includes controlling the ion mobility separator to open each channel of the plurality of channels for 50 percent of the plurality of ion pulses.

18. The computer-readable medium of claim 14, wherein the determining the signal based on the Hadamard algorithm includes deconvolving the signals acquired by the mass analyzer for the plurality of ion pulses to isolate the signal associated with the ions ejected from the channel of the ion mobility separator.

19. The computer-readable medium of claim 18, wherein the deconvolving the signals includes adding the signals acquired by the mass analyzer for each ion pulse of the plurality of ions pulses that the channel is open and subtracting the signals acquired by the mass analyzer for each ion pulse of the plurality of ion pulses that the channel is closed.

20. The computer-readable medium of claim 14, wherein the instructions further direct the at least one processor to generate, based on the signal associated with the ions ejected from the channel of the ion mobility separator, a mass spectrum representative of an intensity of the ions as a function of a mass-to-charge ratio of the ions.

21. A system comprising:

an ion mobility separator including a plurality of channels, wherein each channel of the plurality of channels is configured to accumulate ions according to mobilities of the ions;

a mass analyzer configured to generate a signal based on ions ejected from the plurality of channels and detected by the mass analyzer; and at least one computing device communicatively coupled to the ion mobility separator and the mass analyzer and configured to perform a process comprising:

opening, based on a Hadamard algorithm, a distinct set of channels of the ion mobility separator for each ion pulse included in a plurality of ion pulses, wherein, during each ion pulse of the plurality of ion pulses, ions accumulated in the open channels are ejected toward the mass analyzer;

obtaining, for each ion pulse of the plurality of ion pulses, a signal acquired by the mass analyzer for the ejected ions; and determining, based on the signals for the plurality of ion pulses and based on the Hadamard algorithm, a signal associated with the ions ejected from a channel of the ion mobility separator.

22. The system of claim 21, wherein the determining the signal based on the Hadamard algorithm comprises assigning each channel of the plurality of channels to a column of a matrix and each ion pulse of the plurality of ion pulses to a row of the matrix such that each row of the matrix indicates whether each channel was open or closed for each ion pulse.

23. The system of claim 22, wherein the determining the signal based on the Hadamard algorithm further comprises assigning the signal acquired by the mass analyzer for each ion pulse to each element of the matrix associated with open channels for the corresponding ion pulse.

24. The system of claim 23, wherein the determining the signal based on the Hadamard algorithm further comprises adding the signals of all rows of the matrix associated with a select channel of the ion mobility separator being open and subtracting the signals of all rows of the matrix associated with the select channel of the ion mobility separator being closed.

* * * * *